(No Model.)

G. T. ARMITAGE.
APPARATUS FOR UTILIZING EXHAUST STEAM.

No. 465,331. Patented Dec. 15, 1891.

Witnesses:

Inventor:
Geo. T. Armitage.
per Joshua Pusey
atty.

UNITED STATES PATENT OFFICE.

GEORGE T. ARMITAGE, OF PHILADELPHIA, PENNSYLVANIA, ASSIGNOR TO CHARLES T. BAKER, OF SAME PLACE.

APPARATUS FOR UTILIZING EXHAUST-STEAM.

SPECIFICATION forming part of Letters Patent No. 465,331, dated December 15, 1891.

Application filed September 14, 1891. Serial No. 405,596. (No model.)

*To all whom it may concern:*

Be it known that I, GEORGE T. ARMITAGE, a citizen of the United States, residing at the city and county of Philadelphia and State of Pennsylvania, have invented certain new and useful Improvements in Apparatus for Utilizing Exhaust-Steam, of which the following is a full, clear, and exact description, reference being had to the accompanying drawings, in which—

Figure 1:
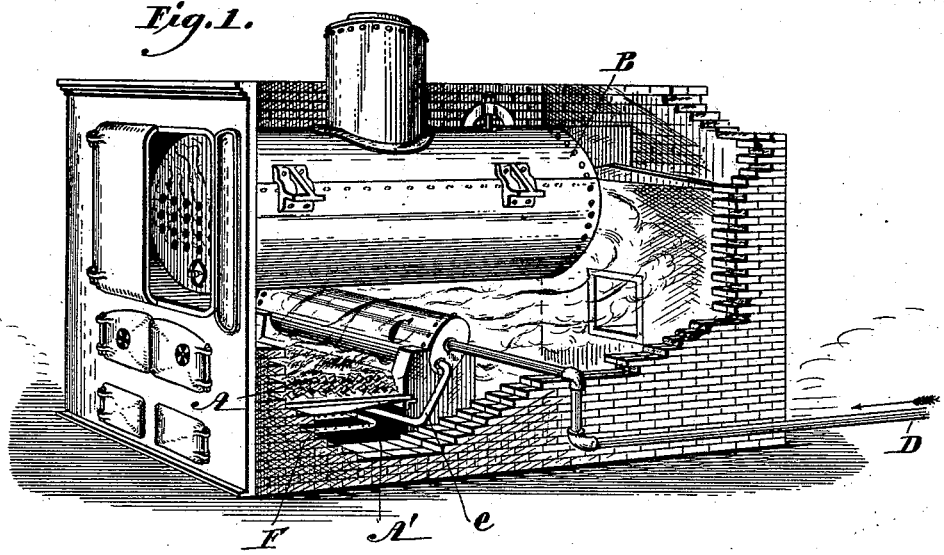
Figure 2:
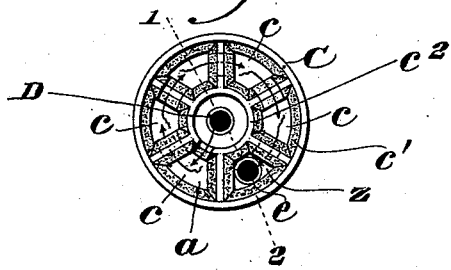
Figure 3:
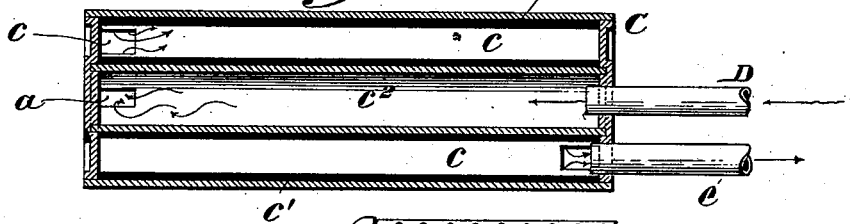
Figure 4:
Figure 5:

Figure 1 is a sectional perspective view of a furnace structure to which my invention is applied. Fig. 2 is an end view of the retort, the head being removed. Fig. 3 is a longitudinal section of said retort as on the line 1 2, Fig. 2. Fig. 4 is a transverse section of the retort with the fire-brick lining removed. Fig. 5 is a plan view of a distributing device, hereinafter referred to.

The nature of my invention is an apparatus for treating exhaust-steam and utilizing the same as a medium for the better combustion of fuel in furnaces; and it consists in mounting upon or in relation to the bridge-wall of a furnace a retort of novel construction and connecting with this retort an exhaust-steam-supply pipe, whereby exhaust-steam is conducted to the retort and superheated therein, and connecting, also, with the retort a discharge-pipe which communicates with a distributing device located underneath the grate of the furnace, whereby the said superheated steam is fed to said device and delivered therefrom, under pressure, to the fuel in the furnace, as will be hereinafter fully explained.

Referring to the annexed drawings, A represents the usual furnace, A' the ash-pit thereof, and B a steam-boiler.

Mounted transversely on the usual bridge-wall, at the rear of the furnace, is a retort C, in which is a series of longitudinal passages $c$, which alternately communicate at opposite ends. These passages are lined with fire-brick $c'$, and they are arranged in circular series, as illustrated, to conform with the internal shape of the retort. Extending through the latter is a central pipe $c^2$, which communicates at one end with one of the passages—that is, with the initial passage, marked $a$. To this pipe the exhaust-steam-supply pipe D is connected, the construction being such that the steam fed to the pipe D passes in a tortuous direction through the several passages $c$ in the retort. The final passage is located in the forward side of the retort—that is, the side subjected to the direct action of the heat from the furnace—as indicated at $z$. Extending from said last-mentioned passage is a pipe $e$, which is connected with a series of perforated distributing-pipes E, disposed underneath the grate-bars of the furnace. The exhaust-steam in its prolonged passage through the highly-heated retort is superheated. Thence it passes to the pipes E and issues therefrom, under pressure, into the fuel in the furnace. When the steam strikes the incandescent mass, the steam is decomposed, its constituent gases thus commingling with the gaseous elements in the fuel and aiding in the combustion of the latter. By so mounting the retort that the final passage therein, through which the steam flows, is subjected to the direct action of the heat, as above stated, a better practical effect is produced than otherwise.

The passages in the retort are preferably constructed in the manner represented in the illustration—that is to say, the internal wall of the cylinder has formed thereon a series of radial wings which terminate in the central pipe—the whole being integral. The fire-brick lining is applied to the surfaces of these wings.

Having thus described my invention, I claim as new and wish to secure by Letters Patent—

1. The combination, with the furnace structure, of the cylindrical retort, the alternately-communicating longitudinal passages arranged in circular series around the interior wall of said retort, this wall constituting the outer wall of each of the passages, the steam-supply pipe communicating with one of said passages, the discharge-pipe communicating with the final passage, and the distributing device located in respect to the furnace-grate substantially as described.

2. The combination, with the furnace structure, of the retort with the series of alternately communicating longitudinal passages arranged around its interior wall, and the central pipe communicating with the initial one of said series of passages, the steam-supply pipe communicating with said central pipe, the discharge-pipe communicating with the final passage, and the distributing device located in respect to the furnace-grate and connected with said discharge-pipe substantially as described.

3. The herein-described retort, comprising the combination of the cylinder, the series of alternately-communicating passages therein, and the fire-brick lining in said passages, together with the central pipe communicating with one of the latter, the said cylinder, the pipe, and the walls of said passages being integral, substantially as described.

In testimony whereof I have hereunto affixed my signature this 25th day of August, A. D. 1891.

GEO. T. ARMITAGE.

Witnesses:
   JOHN R. NOLAN,
   C. R. MIDDLETON.